Figure 1:
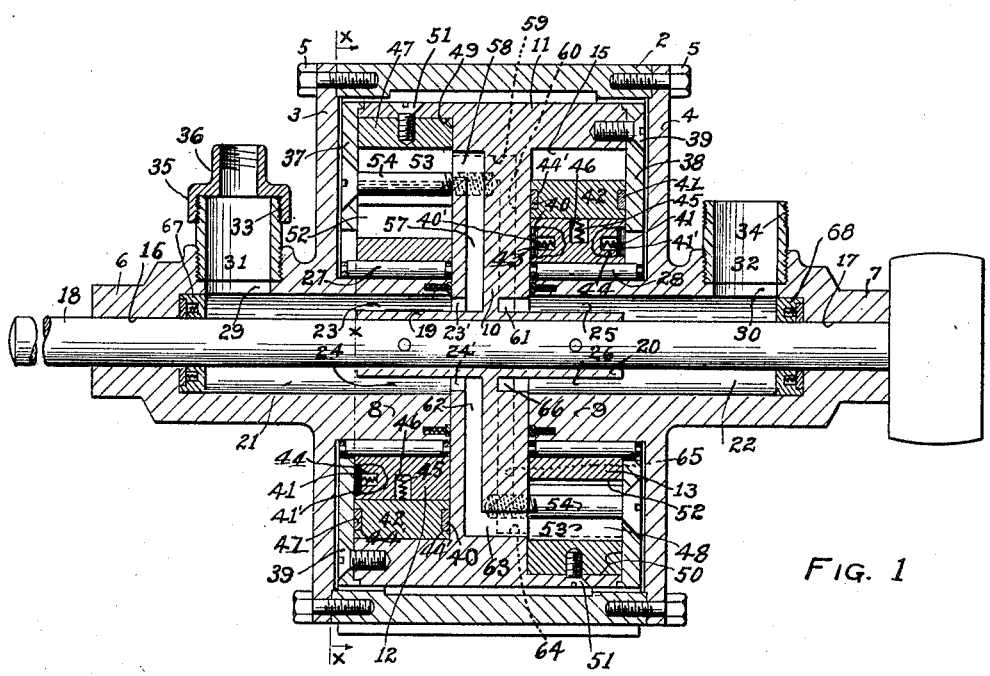

J. C. OLSEN.
ROTARY ENGINE.
APPLICATION FILED OCT. 17, 1911.

1,067,190.

Patented July 8, 1913.

WITNESSES:
Wm G Blomstran.
Harry E. Stevens.

INVENTOR
John C Olsen
BY
Warner Peckstrom
ATTORNEY

UNITED STATES PATENT OFFICE.

JOHN C. OLSEN, OF CHICAGO, ILLINOIS, ASSIGNOR OF ONE-HALF TO P. McARTHUR, OF CHICAGO, ILLINOIS.

ROTARY ENGINE.

1,067,190.  Specification of Letters Patent.  Patented July 8, 1913.

Application filed October 17, 1911. Serial No. 655,177.

*To all whom it may concern:*

Be it known that I, JOHN C. OLSEN, a citizen of the United States, residing at Chicago, in the county of Cook and State of Illinois, have invented certain new and useful Improvements in Rotary Engines, of which the following is a specification.

This invention relates to engines of the rotary type.

One of the several objects of my invention is to provide a construction wherein excessive friction is obviated.

Another object is simplicity of construction, which is one of the most important considerations in connection with the adoption of engines for use in aerial navigation.

A still further object is to overcome vibratory movements which cause wear and tear of the machinery and unpleasant noises. But the several improvements of my invention will perhaps appear more fully from a detailed description of the one form of embodiment thereof illustrated in the accompanying drawings, and my invention therefore consists in the novel construction, combination, and arrangement of parts hereinafter described in detail, illustrated in the drawing and incorporated in the appended claims.

Figure 2:
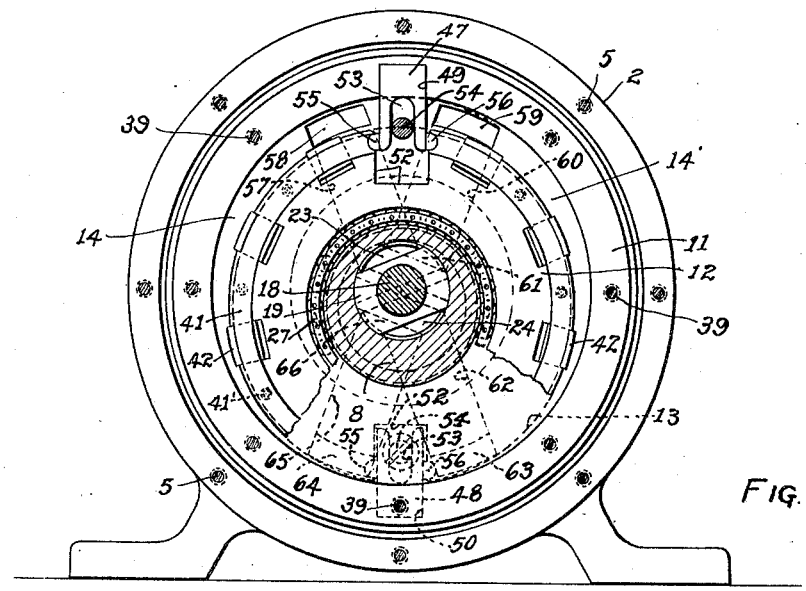

In the drawing—Figure 1 is substantially a medial vertical section taken longitudinally of the shaft, showing the inlet-ports in the fly-wheel in full lines and the outlet ports, also in the fly-wheel, in dotted lines, parts being broken away to show the springs which actuate the packing rings. Fig. 2 is a section taken substantially on line *x—x* of Fig. 1.

In my improved engine the piston or abutment, or the movable part against which the steam acts, is relieved of the usual friction-engagement with the walls of the steam or expansion chamber, these walls moving, as it were, with the piston. The steam expansion chamber is of crescent form and is formed between the inner periphery of an annular fly-wheel and outer periphery of a wheel mounted within said fly-wheel which I term the "idler." The latter rotates on an independent axis or shaft, which, of course, must be arranged laterally of the fly-wheel shaft in order to produce the crescent-shaped steam-space referred to. The idler shaft is stationary and the idler rotates about it. This shaft is in the form of an inwardly projecting hub formed on the engine casing. This hub is hollow and through same passes the fly-wheel shaft which is keyed to the fly-wheel. The space within the hub forming the idler-bearing is larger in cross-section than the cross-section of the fly-wheel shaft, and the space between the latter and the walls of the hub is used as a steam-port. The axes of the fly-wheel and idler are therefore eccentric to each other, but the eccentricity is a fixed one. The piston or abutment against which the steam acts to produce motion, forms a bridge or wall through the steam-space and connects the idler and fly-wheel, and owing to the eccentricity of the axes of these two elements any diametrical line of the one cannot be parallel with a given diametrical line of the other except in the plane of two diametrically opposite points in the path of movement of said wall, abutment or piston. Hence provision must be made for tangential or angular movement of the latter with relation to the idler.

Referring in detail to the several views of the drawing. These views show an engine having the above-described parts substantially duplicated, the duplication as to the fly wheel consisting in the provision in a single wheel for several pistons and steam expansion chambers.

The casing of the engine consists of a cylindrical body 2, which is preferably a casting. The ends of this cylinder are closed by end-plates 3 and 4 secured to the body 2 by means of lag-screws 5. Cast integrally with the casing-ends 3 and 4 are outwardly projecting hubs 6 and 7 and inwardly projecting hubs 8 and 9. Between the ends of the latter sufficient space is provided to snugly receive the web 10 of a fly-wheel having a rim 11 which extends beyond both sides of the web, these extensions being in the nature of annular flanges on the web which, with the opposite sides of said web, form circular receptacles. Within the latter are mounted annular disks which I term "idlers" 12 and 13. These idlers are of smaller diameter than the circular spaces formed by the rim 11, and same are mounted in their recesses or pockets so that the lower parts of their outer peripheries rest upon the corresponding parts of the inner peripheries of the fly-wheel rim or flanges. When thus mounted crescent-shaped spaces 14 and 15 are formed between the idlers and fly-wheel rim. These spaces are the steam expansion chambers of the engine. The hubs 6 and 7 serve as bearings for the driving-shaft 18, for which purpose said hubs have shaft-bores 16 and 17. This driving shaft 18 is keyed to the fly-wheel through hubs 19 and 20 which project from its web 10 into bores 21 and 22 formed within the hubs 6 and 8 and 7 and 9. The fly-wheel hubs 19 and 20 fill those portions of the spaces 21 and 22 which they enter with the exception of flattened portions on the hubs between which and the walls of the bores steam-ports 23 and 24, on one side, and 25 and 26 on the other side of the fly-wheel are provided. The outer surfaces of the inwardly projecting hubs 8 and 9 are turned and form bearings for the idlers. Between these bearings and the inner peripheries of the idlers endless chains 27 and 28 of anti-friction rollers are interposed. As shown in both views of the drawing, the shaft 18 and the bearings for the rollers 27 and 28 are eccentric to each other, which eccentric arrangement forms the crescent-shaped steam chambers 14 and 15 referred to.

Through the sides of the hubs 6 and 7 are formed steam-ports 29 and 30 which communicate with the spaces 21 and 22. One of these serves as the steam-inlet port while the other serves as the exhaust-port. Into the bores 29 and 30 are threaded nipples 31 and 32. The upper ends of these nipples have thereon threads 33 and 34 adapted to receive a reducing collar 35 having a nipple 36 which may be connected with the live steam inlet-pipe (not shown), the construction of the engine being such that each of the openings 29 and 30 may be used either as the inlet or as the exhaust, or, in other words, so that the engine may be reversed. Both the inlet and the exhaust port are therefore made large enough to serve as the exhaust port and the differentiation as to size is accomplished by using the reducing collar, or other equivalent.

The most advantageous arrangement for changing the inlet-port into an exhaust-port quickly for the purpose of instantaneous reversing are not shown, as these features form no part of the present invention.

The idlers are completely inclosed in their recesses or chambers (save for the steam-ports) by plates 37 and 38 which are fastened by screws 39 to the fly-wheel cylinder rim or web-flanges 11. Leakages of steam from the steam-spaces 14 and 15 are prevented by packing-rings 40 and 41 which are held against the side-plates 37 and 38 and the web 10 by means of springs 40' and 41' held in recesses 43 and 44 in the sides of the idlers. In Fig. 1, at 43 and 44, the engine is broken away to the opposite side to disclose these springs 40' and 41'. On the peripheries of the idlers are packing shoes 42 which are lodged in peripheral recesses of said idlers and in the sides of these shoes are recesses 44' for the packing-rings 40 and 41 which are preferably open and flexible rings. The shoes 42 are designed to make a steam-tight closure between the idlers and fly-wheel where they touch or meet, and back of the shoes are outwardly pressing springs 45 lodged in recesses 46.

In recesses 49 and 50 in the inner periphery of the rim 11 are secured a pair of pistons 47 and 48 which extend into the idlers and operate in the usual manner of engines of this type. A description of the parts associated with one of these pistons will suffice for both, the arrangements being identical for both pistons.

The projecting end of each piston rests in a recess 52 in its idler, which recess is of a sufficient depth to permit the piston to move its projecting portion entirely into the idler. The piston is preferably forked by a slot 53 and this slot is engaged by a screw 54 having threaded engagement or support at one end in the web of the fly-wheel and having its other or head end supported in the face plate, which is 37, in one case and 38 in the other, as shown in Fig. 1. This screw 54 assists in supporting the piston in its fixed relation relative to the fly-wheel. As the axes of the idler and fly-wheel are not concentric and the piston, therefore, moves in a circle which is eccentric to the idler circle of movement, the piston will be out of radius with the axis of the idler and out of alinement with the imaginary line passing through both the idler and fly-wheel axes. This dis-alinement will greatly increase as the piston moves to the right or left (Fig. 2) until it has reached a point at right angles to the said imaginary lines (a vertical axial line) after which the piston will gradually move toward radial alinement with the idler center. Provision is made for this angular movement of the piston relative to the idler by mounting its inner end for both longitudinal and angular movement between the sides of two semi-cylindrical rollers 55 and 56 the curved sides of which are mounted in correspondingly curved recesses in the sides of the slot or space 52 provided for the endwise movement of the piston. Thus the piston moves angularly on the curved bearing surfaces of the semi-cylindrical bearing rollers, 55 and 56, and longitudinally or slidably on the flat surfaces of said bearing members 55 and 56.

Referring, now, to the inlet and exhaust ports, immediately leading to and from the steam spaces, the steam passage 23, which is of segmental form in cross section, as shown in Fig. 2, extends a short distance into the web 10 of the fly-wheel in the form of a passage 23'. At right angles to the latter and radially, with respect to the axis of the fly-wheel, is a passage 57 that extends to the rim of the fly-wheel and thence leads into the steam space 14 through a second transverse or horizontal opening 58 which is substantially similar to the opening 23′. The exhaust passages for the steam space 14 are similarly arranged, but on the opposite side of the piston, as shown best in Fig. 2. The exhaust passage consists of a transverse or horizontal passage 59 leading from the space 14 into a radial passage 60 in the web of the fly-wheel and this radial passage 60 has its outlet into a horizontal outlet passage 61. The latter leads into the segmental passage 25 within the hub 9 through the passage 22 and the nipple 32 to the atmosphere. For the opposite side of the engine, or the ports associated with the idler 13, the arrangement is substantially identical, but reverse as to the position of the piston and its ports. The steam inlet for the expansion chamber 15 is substantially a continuation of the passage 57 to the diametrically opposite side of the wheel where the annular passage 21 and the segmental passage 24 lead into a short passage 24′ that is identical with the passage 23′. The passage 24′ leads into a radial passage 62 which corresponds to the passage 57, and said passage 62 conveys the live steam into a transverse passage 63 leading into the steam space 15. The exhaust passages for the steam space 15 are a transverse passage 64 indicated by dotted lines (which corresponds with the passage 59 for the steam space 14), and a radial passage 65 leading back toward the axis of the fly-wheel where it finally exhausts through a short horizontal passage 66 into the central passages 26 and 22.

As will be seen by reference to Fig. 2, the steam space 14 (and likewise the steam space 15) is divided by the piston 47 and the junction of the idler rim with the fly-wheel rim into virtually two steam chambers, the one to the left being in Fig. 2 the live steam chamber, and the one to the right being the exhaust chamber. For the sake of convenience the latter is distinguished by being labeled 14′, while the former is labeled 14. If the port 59 is used as the inlet port and the port 58 is used as the exhaust the chamber 14′ would be the live steam chamber and the chamber 14 the exhaust chamber. Assuming that the port 58 is the live steam inlet port, then the fly-wheel and idler will be rotated toward the right and the live steam chamber will (in the absence of a cut-off valve-mechanism, not shown) continue to receive steam continuously from the moment port 58 begins to open at the lower or contracted end of the space 14, which would be (looking at Fig. 2) substantially in the position labeled 64, using this figure to represent the front side of the view, until said port 58 reaches its lowest point on the opposite side, for which purpose 63 may be used, applied to the front side, as indicating said position. In this position the idler serving as a cut-off valve begins to close the port 58; that is, the said port is closed by the inner side of the idler 12. In the meantime the port 59 will continuously exhaust through the passages 59, 60, 61, 26, 22 and 32 until the exhaust port is cut off or closed by the inner side of the idler or valve 12, which closing begins substantially at the point of the circle indicated at 63; thus the crescent-shaped chamber will be continuously supplied with live steam during the rotation of the valve 58 from the point 64 up to substantially the point 63 and the space in advance of the piston 47 will continuously exhaust the air or steam through the port 59 until said port is closed as aforesaid. That portion of the steam space labeled 14 will not therefore be exhausted until the exhaust port 59 reaches said space 14, which happens about the same moment that the port 58 is being closed to be re-opened on the opposite side for the purpose of creating, as it were, a new crescent-shaped live steam chamber, the entire former live steam chamber being now for the moment a crescent-shaped but continuously diminishing, exhaust chamber, while a new crescent-shaped live steam chamber is being formed from the position 64 to the position 63. The same operation takes place at the opposite side of the engine, but in reverse order. This maintains a perfect balance or equilibrium and prevents vibrations, due to the action of the steam upon the pistons; that is, when piston 47 is in the position of maximum effectiveness, as it is shown in Fig. 2, or in the widest part of the crescent-shaped steam chamber, the opposite piston 48 is at the zero or cut-off point where it is not acted upon at all. In other words, as the exposed area of the one piston increases the corresponding area of the opposite piston decreases to a like extent. The net result is that the two pistons combined give the engine a uniform power at all times equal to the maximum driving capacity of one of its pistons when its full area is exposed to the steam force while it is in the position shown in Figs. 1 and 2.

By the gradual contraction of the live steam space in the rear of the piston until the apex—a mere point or thread—remains as a re-acting end for the steam chamber, the force of re-action is diverted or wedged into directions which are lateral to the path of the piston. As a consequence said re-acting force is virtually converted into a load imposed upon the axes of fly-wheel and idler,—a load carried, as it were, upon the wheels of the driven vehicles, namely, the fly-wheel and idler. In the form of a load the force of re-action is incapable of acting as such in opposition to the force upon the piston, and this load is not a "dead" load representing the combined radial pressures exerted directly upon the bearings, because if the pressure is equally distributed at all points throughout the steam chamber the pressure will represent a number of lines of forces acting radially, and these lines of forces will to some extent oppose each other or represent parallelograms of forces, and where these radial forces are directly opposed to each other they will entirely nullify each other. After the piston has reached its vertical position the steam chamber in the rear of the piston will have divergent instead of convergent walls, but while this divergent part of the walls of the steam chamber does not operate to deflect the reaction laterally, as does the convergent part, this does not affect the operation for the convergent part, and as the divergent part increases the forces of action and reaction decrease to a like extent so far as the working of the piston is concerned. By placing the pistons in opposition so that the one piston constantly increases in effectiveness while the other decreases in power to a like extent the combined power of the two pistons is at all times substantially equal to the maximum driving capacity of one of the pistons, as when its entire active area is exposed to the steam pressure.

In the above-described construction of engine, the well known difficulties of friction and steam-leakages between the abutment or piston and the walls of the steam expansion chamber, are entirely obviated. In the present invention the only friction and wear imposed upon or by the piston is that slight one occasioned by the limited longitudinal or sliding movement in the cylindrical bearings and the latter's almost insignificant rotary movements. The friction created between the sides of the idlers and their side plates on the one side and web of fly wheel on the other, is merely that occasioned by the slight disalinement and realinement of the piston with the center of the idler, as otherwise the idler and fly wheel move together. Between the outer casing walls and the rotating parts there is or need be no friction whatever. The only remaining wearing parts are the shaft-bearings common to all engines and the bearings for the idlers. The idler-bearings occupy such a position in the general construction that they may conveniently be made as large or strong as necessary.

To the shaft 16 are keyed a pair of collars 67 and 68 for which recesses are made in the bearings 6 and 7. The collars fill these recesses and neutralize any endwise pressure produced on the shaft by the steam, by transmitting the pressure in both directions to the shaft.

The improvements described in the foregoing provide a solid shaft, instead of the usual hollow one through which steam is admitted in this type of engine; the fly-wheel, or outer cylinder within which the idler, core or inner cylinder is mounted, is keyed to the solid shaft by means of a hub integral with the equivalent of the spokes connecting such hub with the rim of the fly-wheel cylinder, and the spokes in this case are in the form of a solid web which contains the steam-ports. In the present invention the fly-wheel cylinder has no bearings other than the bearings of the solid shaft with which said fly-wheel, web, and hub are substantially one member. The bearings of said solid shaft are not interiorly located so as to be inaccessible to oiling means in the usual way. The outer sides of my drum-shaped fly-wheel cylinder do not contact with any other part. The small shaft made possible by leaving the shaft solid eliminates considerable friction by reason of its small number of surface inches covered by bearings and thereby facilitates a high engine speed. By reason of the fly wheel cylinder rotating on the shaft-bearings only the life of the engine is greatly prolonged. None of the bearings are exposed to the steam, which is a vital improvement over constructions which have their bearings so exposed. In the present construction power may also be taken from either end of the shaft which is concentric with the rim of the fly-wheel cylinder.

The bearings for the idlers, cores, or inner rings between which and the fly wheel cylinder are arranged the usual pistons or abutments are on the outer surfaces of the inwardly projecting hubs 8 and 9 on the casing sides and are therefore not exposed to the steam passing within said hubs. The only friction parts, other than said bearings, are between the packing rings, at the sides of the idlers, and the side-walls within the fly-wheel cylinder, (but as the movements between these parts are very limited this amounts to but very little) and between the packing shoes 42 and the inner periphery of the fly wheel. On the idler roller bearings heavy oil or grease may be maintained because no steam enters the outer casing. As an inclosure of the fly wheel the casing may be omitted entirely without affecting the operation of my engine, and if only the shaft-bearing and steam-inlet portions only are retained the roller bearings are exposed to the cooling action of the outer air.

Having thus described my invention, I claim as new and desire to secure by Letters Patent—

1. The combination with the fly-wheel cylinder, of a driving-shaft, a cylinder hub keyed to said shaft, a web connecting said hub with the inner periphery of said cylinder, a steam space and passage in said web, an idler within said cylinder, a bearing-member having separate bearings thereon for said cylinder and idler, and steam-operated means for rotating said cylinder and idler.

2. The combination with a fly-wheel cylinder having a hub and a spoke connection between the periphery of said cylinder and said hub, said spoke connection being in the form of a web dividing the interior of said cylinder into two chambers, an idler eccentrically mounted within each of said chambers, a driving-shaft to which said hub is keyed, a support having bearings therein, separate bearings on said support for said shaft and said idlers, and steam actuating means for rotating said cylinder and idlers.

3. The combination with a stationary casing and engine support, of driving-shaft and idler-roller-bearings forming a substantially integral part of said casing, a solid driving shaft, a fly-wheel cylinder having a web and a hub keyed to said driving shaft, steam-spaces within said cylinder, idlers within said cylinder, pistons connecting said idlers with said cylinder, and means for introducing steam to said steam-spaces, and for exhausting steam from said steam-spaces.

4. The combination with the driving shaft, of a support having bearings therein for said shaft, a fly-wheel cylinder having its axis keyed to said shaft, said cylinder having spaces for idlers therein, roller-bearings for said idlers mounted eccentrically to the axis of said cylinder, said roller-bearings forming a part of said casing, and steam-actuated driving means for said cylinder and idlers.

In testimony whereof I have hereunto set my hand in the presence of two subscribing witnesses.

JOHN C. OLSEN.

Witnesses:
J. W. BECKSTROM,
M. C. ALLEN.

---

Copies of this patent may be obtained for five cents each, by addressing the "Commissioner of Patents, Washington, D. C."